Mar. 3, 1925.

J. L. HOAR 1,528,057

CALL CARD

Filed Aug. 8, 1922

Inventor
J. L. Hoar.
By Attorney
Richard J. Cook

Patented Mar. 3, 1925.

1,528,057

UNITED STATES PATENT OFFICE.

JOHN L. HOAR, OF TACOMA, WASHINGTON.

CALL CARD.

Application filed August 8, 1922. Serial No. 580,423.

*To all whom it may concern:*

Be it known that I, JOHN L. HOAR, a citizen of the United States, and a resident of Tacoma, county of Pierce, and State of Washington, have invented certain new and useful Improvements in Call Cards, of which the following is a specification.

This invention relates to improvements in call cards, and more particularly to cards of that character especially useful in connection with the checking by transfer companies, of baggage for transportation over railway lines.

There is at this time a tariff regulation in effect which provides that passengers, except those holding free transportation, must in all cases when checking baggage make a written declaration of the value of such baggage, and no baggage will be checked or forwarded unless this is done. The regulation also provides for the collection, by the railway company, of a charge of ten cents per one hundred dollars for all valuation declared in excess of that allowed on the passengers ticket.

Under the present system, transfer men when checking baggage have the passenger make written declaration of value on a blank especially prepared for this purpose and then, if the baggage is of excessive value, they make the proper collection from the passenger and affix certain adhesive stamps to the duplicate check which the passenger uses to claim his baggage at his destination. This check must be surrendered when the owner takes delivery of the baggage.

Some of the disadvantages of the system now in use are: It requires the transfer men to carry a large number of adhesive stamps of different denominations and these, on account of their character, may become stuck together or otherwise damaged. Much time is consumed in affixing and canceling the stamps. It also requires the accounting by the transfer companies to the railway companies for collections covering excess value, and it affords opportunity for manipulation of stamps for illegal purposes.

In view of these disadvantages, above noted, it has been the object of this invention to provide a call card which, by its use, will entirely eliminate the use of such adhesive stamps; will eliminate all accounting by the transfer companies; will greatly facilitate the checking of baggage and the reporting of collections by the station baggage men, and will simplify and greatly expedite the checking of such reports by the accounting departments of the railroads.

More specifically stated, it is the object of the invention to provide a call card embodying a series of detachably connected coupons; one of which serves as a receipt for the passenger showing the amount paid for excess valuation, another serves as a receipt for the transfer company showing delivery of the baggage to the railway station and amount collected for excess value, another is the declaration of value signed by the passenger to be retained by the station baggage man, and another is to be delivered by the station baggage man to the railway auditor with the report on which such collections are accounted for. Each of the coupons bears thereon the names of the initial carriers over which it is possible to check, and amounts possible to be collected for excess valuation on baggage, and the coupons are so arranged and adapted to be so folded together that, by means of a suitable ticket punch, the name of the initial carrier and amount paid by the passenger can be punched out on all coupons at the same time.

In accomplishing these objects of the invention, I have provided the improved details of construction, the preferred forms of which are illustrated in the accompanying drawings, wherein—

Figure 1 is a front, or face, view of a call card embodied by the present invention; the card being shown unfolded.

Figure 2 is a similar view of the back face of the card.

Figure 3 is a perspective view of the card folded together.

Referring more in detail to the drawings—

1 designates a call card embodied by the present invention, comprising four separable coupons 2, 3, 4 and 5 respectively, which may be torn apart along transverse lines of perforations, as designated at 6. The three upper coupons: namely, 2, 3 and 4 are of equal length, while the lower one is slightly shorter than the others. The coupon 2 at the top of the card is that which is delivered by the station baggage man to the railway auditor with reports on which collections are accounted for. The coupon 3 is that on which the passenger makes his written declaration of value of his baggage, in lieu of the form now in use, previously referred to; it provides spaces for the insertion of the date, valuation of baggage, shipper's signature and address and other information. The coupon 4 is that which serves as the receipt to the transfer company for the baggage delivered to the station baggage man and for the excess value collection made and delivered. It provides space thereon for the insertion of the date, the check number covering the baggage and the signature of the baggage man receiving the baggage at the station. The lower coupon 5 is that which is retained by the passenger as a receipt for the money paid for excess value at the rate of ten cents per one hundred dollars excess valuation.

On the front face of the coupon 2, as shown at 10 in Figure 1, and on the back face of the coupons 3 and 4, as shown at 11 and 12 in Figure 2, are printed the names of the railway lines which enter any certain place wherefrom shipment may be made. Also, on the front face of all of the coupons, are columns of figures, as at 15, designating amounts possible to be paid by passengers for excess value of baggage. The location of the names of the various railways and the columns of figures on the several coupons is such that when the card is properly folded together, as is shown in Figure 3, they will coincide and, by the use of a suitable ticket punch, a punch mark may be made simultaneously in all the coupons opposite the name of the same railway line and the amount collected from the passenger.

Each coupon bears the same identifying number, or symbol, on its back face; the cards preferably being numbered consecutively.

I have also provided openings 20 through the three upper coupons which will register when the card is folded together, so that a strap for attaching the card to the baggage may be extended therethrough.

While it is not absolutely essential to the use of the card, each coupon may have printed thereon certain information and directions to be followed by the user of the card.

Assuming that the call cards are provided in the form as above described, their use would be as follows: The transfer man, when receiving baggage from a passenger, first requires the passenger to declare the value of his baggage, over his signature which he places on a line provided on the front face of the coupon 3. When this is done, the expressman folds the card in the manner as shown in Figure 3 and then punches out the asterisks opposite the amount collected from the passenger as charge for excess valuation. Likewise a punch mark is made through the folded card opposite the name of the railway over which the passenger starts on his journey. Since the arrangement provides that the names of the various railways and columns of figures on the several coupons will coincide when the card is folded, the punch simultaneously punches out these amounts and names on all coupons. The transfer man then detaches the lower coupon 5 and gives it to the passenger together with a duplicate railway baggage check.

The three other coupons, together with the usual railway check are then attached by the transfer man to the baggage and remain so attached until the baggage is delivered to the railway station. The station baggage man will then detach the call card, collect from the transfer man the amount punched on the card as having been paid by the passenger, will sign the receipt coupon 4 for the baggage and the amount collected, and will deliver the receipted coupon to the transfer man.

The station baggage man retains the coupon 3 on which the declaration of value is made and forwards coupon 2 to the railway auditor with the monthly report on which the collection is accounted for.

It is readily apparent that, by the use of such cards, the use of adhesive stamps as now used for reporting such collections will be entirely eliminated, and the pernicious practice of advertising to all who handle the passenger's check the fact that the baggage is of excessive value will be stopped. The cards will also eliminate all accounting by the transfer companies to the railways for collections covering excess value and will very greatly simplify and facilitate the reporting of such collections by the station baggage man and the checking of such reports by the accounting departments of the railways.

Since the coupons of each card bear the same number, and since coupons are retained by the transfer company, the railway accounting department, the passenger and the station agent, it is not possible for the amounts to be manipulated. The checking can be much more quickly accomplished and a great saving in cost is possible.

Having thus described my invention, what I claim as new therein and desire to secure by Letters-Patent, is:

A call card of the class described comprising a series of appropriately designated detachably connected coupons in a single strip; said series beginning at the top of the strip, comprising an auditor's stub, a passenger's declaration of value, an expressman's receipt and a passenger's receipt; the first three of which coupons are of substantially the same length and the latter is of lesser length than the others, and all of which have thereon identical columns of figures and the first three have thereon indicia designating different transportation systems and have openings therethrough to receive a strap; said columns of figures, indicia and the openings of the several coupons being adapted to register when the card is folded together by turning each coupon underneath the coupon next above it and holding them in this relation until all are folded together.

Signed at Seattle, county of King, State of Washington, this 2nd day of August, 1922.

JOHN L. HOAR.